May 7, 1957  R. H. WELLER  2,791,276
CLOTH CUTTING MACHINE
Filed Sept. 2, 1954  2 Sheets-Sheet 1
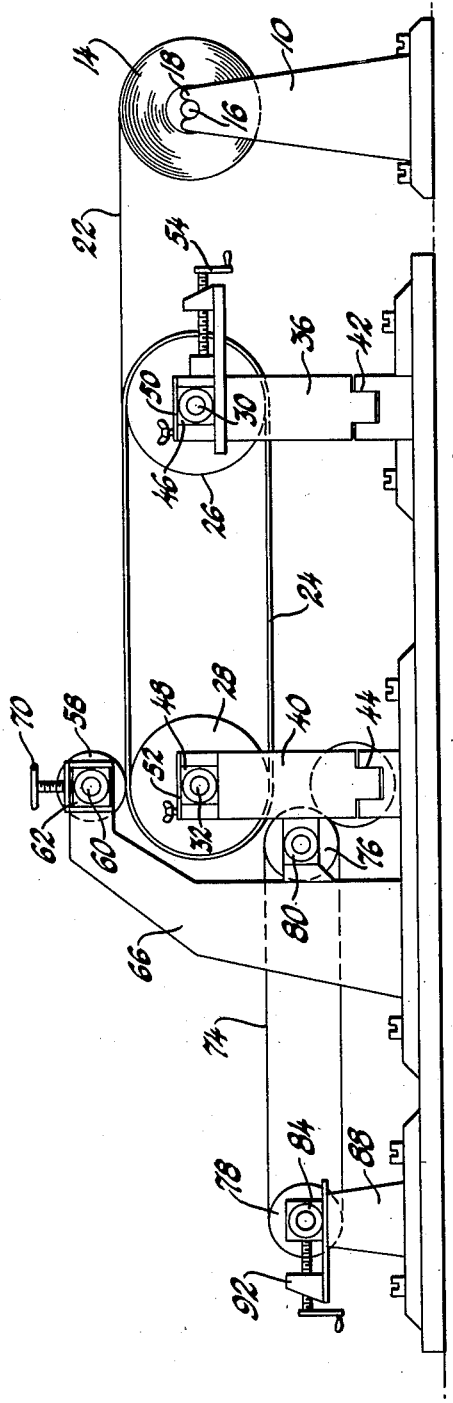
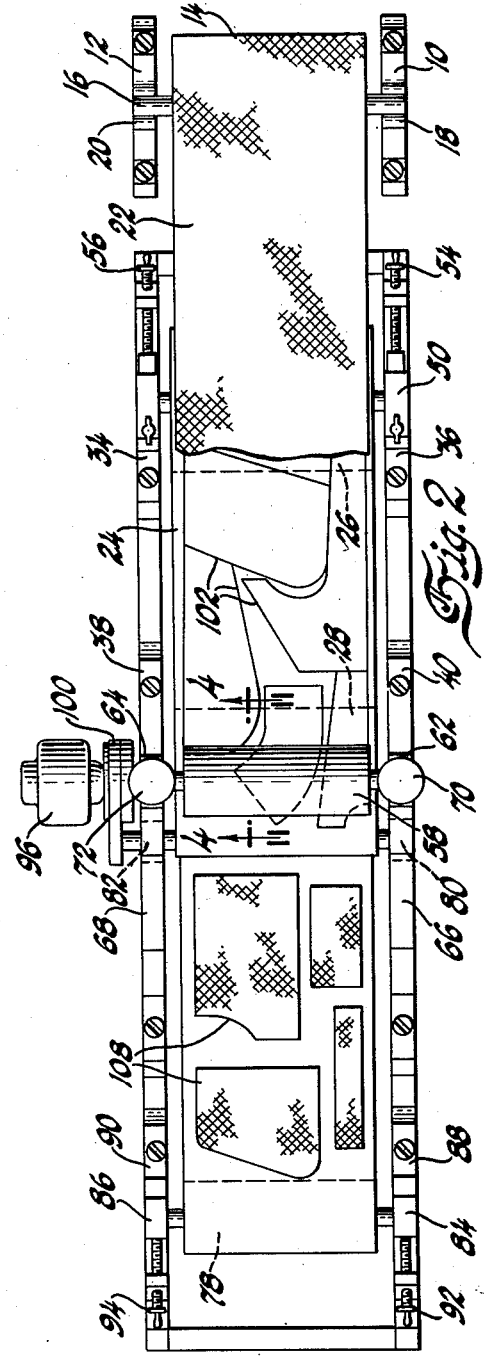
INVENTOR
Ray K. Weller
BY Paul Fitzpatrick
ATTORNEY

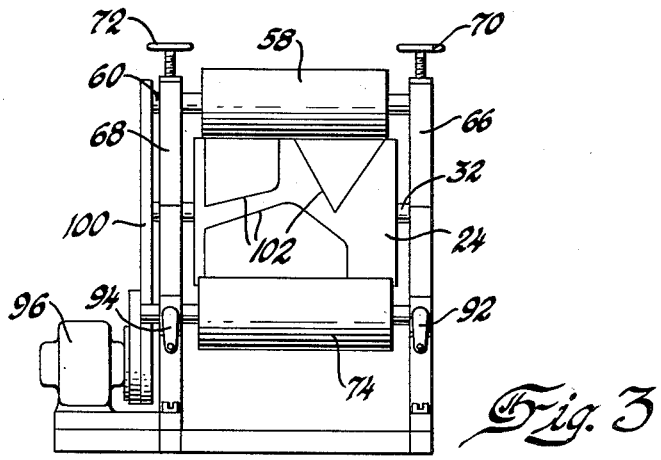
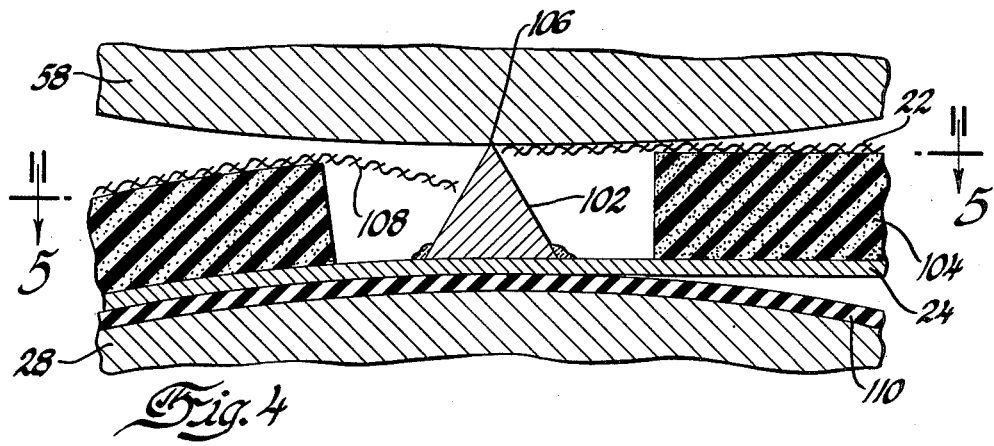
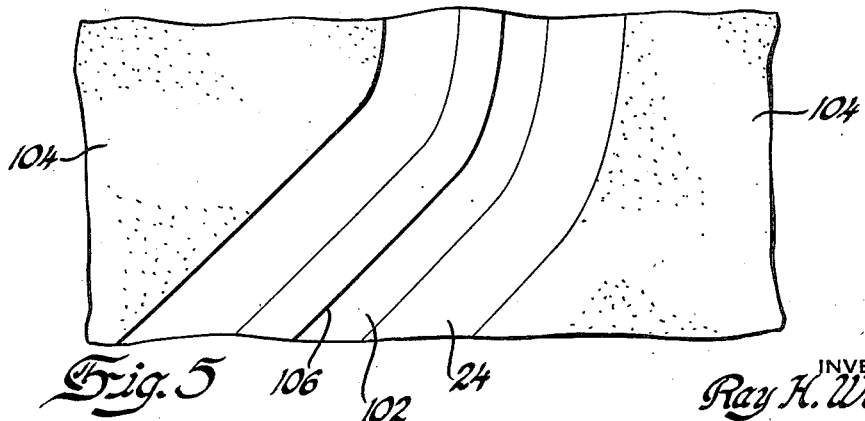

United States Patent Office 2,791,276
Patented May 7, 1957

2,791,276

CLOTH CUTTING MACHINE

Ray H. Weller, Flint, Mich., assignor to General Motors Corporation, Detroit, Mich., a corporation of Delaware Application September 2, 1954, Serial No. 453,751

4 Claims. (Cl. 164—206)

This invention relates to cutting machines and more particularly to machines for the continuous cutting of forms from sheet material of fabric or leather or the like.

An object of the invention is to provide an improved machine to cut sheet material to desired forms both rapidly and economically.

The novel machine essentially comprises an endless flexible belt having raised flexible cutting blades attached thereto in accordance with the desired forms or pattern. The sheet material is fed between the cutting blades of the endless belt and a pressure roller that forces the material against the blades to produce the desired forms. The flexible cutting belt is carried by laterally spaced rollers and the flexible cutting blades are directly secured thereto so that both conform to the curvature of the belt supporting rollers while passing thereover.

Further objects and advantages of the present invention will be apparent from the following description, reference being had to the accompanying drawings, wherein a preferred form of the present invention is clearly shown.

In the drawings:

Fig. 1 is a side elevation of the novel cutting machine embodying the invention;

Fig. 2 is a top plan view of the cutting machine;

Fig. 3 is an end elevation of the cutting machine;

Fig. 4 is a partial section, greatly enlarged, taken substantially on the plane indicated by the line 4—4 of Fig. 2; and Fig. 5 is a partial section taken substantially on the plane indicated by the line 5—5 of Fig. 4.

Referring now to the drawings, upright frame members 10 and 12 rotatably support a roll 14 of material to be cut by means of a shaft 16 and open journals 18 and 20. The material may be any flexible covering such as leather, plastic, or woven fabric, either natural or synthetic, is fed in a continuous sheet 22 to an endless flexible cutting belt 24 carried by spaced rollers 26 and 28 having shafts 30 and 32 journaled on spaced vertical frame members 34, 36, 38 and 40. The frame members 36 and 40 are pivoted at 42 and 44 and bearings 46 and 48 are removably clamped at 50 and 52 so that the frame members 36 and 40 may be swung outwardly for lateral removal and replacement of the endless cutting belt 24. Conventional belt tightening mechanism 54 and 56 permit lateral displacement of the roller shafts 30 and 32 to allow adjustment of the cutting belt 24 to proper tautness. A pressure roller 58 is journaled directly above the roller 28 by the shaft 60 on bearings 62 and 64 supported by spaced vertical frame members 66 and 68. Conventional bearing shifting devices 70 and 72 permit downward movement of the pressure roller 58 against the cutting belt 24 and its supporting roller 28 for the application of the desired pressure thereto.

An endless sorting belt 74 is carried on rollers 76 and 78 supported by bearings 80 and 82 on the frame members 66 and 68 and by adjustable bearings 84 and 86 on the vertically spaced frame members 88 and 90. Conventional belt tightening mechanisms 92 and 94 allow for lateral adjustment of the rolls 76 and 78. A motor 96 provides drive for the rollers 58, 28 and 76 by belting 100. The drive is arranged to provide the rollers 28 and 58 with a uniform peripheral speed.

The flexible cutting belt 24 is preferably fashioned from a thin sheet of spring steel and carries flexible cutting blades 102 of spring steel that are secured by spot welding or brazing in whatever configurations are required to cut the sheet 22 to the desired forms. The machine is particularly applicable to the production of trim material for automotive use as a vehicle interior requires a large number of varying and oddly shaped forms of fabric. The cutting blades 102 may be secured to the belt 24 in continuous runs of any curvature to extend in any direction to produce these forms both rapidly and economically.

In operation the sheet material 22 is placed on the endless belt 24 and is fed between the pressure roller 58 and the belt supporting roller 28. The sheet material is pulled from the roll by the movement of the cutting belt 24 and by the progressive cutting engagement of the material between the roller 58 and the cutting blades 102. The area between the cutting blades 102 of the belt 24 may be surfaced with padding 104 of sponge rubber or felt to insure the proper continuous feeding of the sheet material to the rollers 58 and 28. The rollers are preferably steel and the roller 58 may be case-hardened if desired. The cutting blades 102 are of small a cross-section as possible so they will readily flex to conform to the curvature of the rollers. The cutting blades 102 may be triangular in section, as a uniform section such as shown tends to prevent undue distortion of the blades as they ride over the rollers. The blade cutting edges 106 engage the cylinder surface of the roller 58 at the common vertical center line of the rollers 58 and 28 to shear off the sheet 22 to the desired shaped forms 108. A hard rubber covering 110 may be adhered to the outer surface of the roller 28 to insure uniformity of contact of the cutting edges 106 with the roller 58. The fabric pieces 106 drop on the sorting belt 74 as they emerge from the rollers 28 and 58 for removal from the machine.

While the preferred embodiment of the invention has been described fully in order to explain the principles of the invention, it is to be understood that modifications of structure may be made by the exercise of skill in the art within the scope of the invention which is not to be regarded as limited by the detailed description of the preferred embodiment.

I claim:

1. A cutting machine for cutting forms from sheet material comprising an endless flexible cutting belt, spaced rollers supporting the cutting belt, flexible cutting blades secured on the cutting belt in the pattern of the forms to be cut, and a pressure roller engaging the blade side of the cutting belt for pressing the sheet material against the cutting blades to sever the material to the desired forms, the cutting belt and the cutting blades secured thereto being continuously flexible along their entire length to allow conformance with the curvature of the supporting rollers.

2. A cutting machine for cutting forms from sheet material comprising an endless flexible metallic cutting belt, laterally spaced rollers supporting the cutting belt, flexible metallic cutting blades secured on the cutting belt in the pattern of the forms to be cut, and a metallic pressure roller engaging the blade side of the cutting belt for pressing the sheet material against the cutting blades to sever the material to the desired forms, the cutting belt and the cutting blades secured thereto being continuously flexible along their entire length to allow conformance with the curvature of the supporting rollers, 3. A cutting machine for cutting forms from sheet material comprising an endless flexible cutting belt, spaced rollers supporting the cutting belt, power means for driving the cutting belt, flexible cutting blades secured on the cutting belt in the pattern of the forms to be cut, means for feeding the sheet material on the blade side of the cutting belt, a pressure roller engaging the blade side of the cutting belt for pressing the sheet material against the cutting blades to sever the material to the desired forms, a sorting belt for receiving the forms from the cutting belt, and power means for driving the sorting belt, the cutting belt and the cutting blades secured thereto being continuously flexible along their entire length to allow conformance with the curvature of the supporting rollers.

4. A cutting machine for cutting forms from a sheet of flexible material comprising an endless flexible metallic cutting belt, laterally spaced rollers supporting the cutting belt, power means for driving the cutting belt, flexible metallic cutting blades secured on the cutting belt in the pattern of the forms to be cut, means for feeding the sheet material on the blade side of the cutting belt, a metallic pressure roller engaging the blade side of the cutting belt for pressing the sheet material against the cutting blades to sever the material to the desired forms, a sorting belt for receiving the forms from the cutting belt, and power means for driving the sorting belt, the cutting belt and the cutting blades secured thereto being continuously flexible along their entire length to allow conformance with the curvature of the supporting rollers.

References Cited in the file of this patent
UNITED STATES PATENTS

| | | |
|---|---|---|
| 219,205 | Braley | Sept. 2, 1879 |
| 1,747,182 | Rosener | Feb. 18, 1930 |
| 2,151,703 | Kaplan | Mar. 28, 1939 |
| 2,329,256 | Edelman | Sept. 14, 1943 |